United States Patent [19]
Bierek et al.

[11] Patent Number: 6,123,565
[45] Date of Patent: Sep. 26, 2000

[54] MOTOR-VEHICLE CONTROL UNIT

[75] Inventors: Norbert Bierek, Saal; Christian Plankl, Burgweinting; Josef Dirmeyer, Bodenwöhr, all of Germany

[73] Assignee: Siemens Aktiengesellschaft, Munich, Germany

[21] Appl. No.: 08/940,469

[22] Filed: Sep. 30, 1997

Related U.S. Application Data

[63] Continuation of application No. PCT/DE96/00424, Mar. 8, 1996.

[30] Foreign Application Priority Data

Mar. 31, 1995 [DE] Germany ............................ 195 12 255

[51] Int. Cl.[7] .................................................. H01R 13/64
[52] U.S. Cl. ........................... 439/377; 439/357; 361/756
[58] Field of Search .................................. 439/76.1, 374, 439/377, 357; 307/9.1; 361/724, 727, 756

[56] References Cited

U.S. PATENT DOCUMENTS

| | | | |
|---|---|---|---|
| 3,134,945 | 5/1964 | Wertheimer | 439/297 |
| 3,569,788 | 3/1971 | Niblack | 361/727 |
| 4,017,770 | 4/1977 | Valfre | 361/756 |
| 4,710,136 | 12/1987 | Suzuki | 439/374 |
| 4,807,292 | 2/1989 | Sorscher . | |
| 4,872,212 | 10/1989 | Roos et al. | 174/35.6 C |
| 5,155,663 | 10/1992 | Harase . | |
| 5,280,410 | 1/1994 | Klinger et al. | 361/709 |
| 5,685,069 | 11/1997 | Peter et al. | 29/827 |

FOREIGN PATENT DOCUMENTS

| | | |
|---|---|---|
| 7525862 | 12/1975 | Germany . |
| 3005856A1 | 9/1981 | Germany . |
| 3629296A1 | 3/1988 | Germany . |
| 8903468 | 5/1989 | Germany . |
| 3809607A1 | 10/1989 | Germany . |
| 4023319 | 12/1991 | Germany . |
| 9305939 | 6/1993 | Germany . |
| 4212369A1 | 10/1993 | Germany . |
| 4237870A1 | 3/1994 | Germany . |

*Primary Examiner*—Neil Abrams
*Attorney, Agent, or Firm*—Herbert L. Lerner; Laurence A. Greenberg; Werner H. Stemer

[57] ABSTRACT

A motor-vehicle control unit having an electrical circuit on a support, which may be a printed circuit board or metal plate with stamped conductors. The motor-vehicle control unit includes a plug-in body encasing components of the electrical circuit and is formed with at least two side surfaces. The plug-in body is received in a receptacle of a motor vehicle. The support protrudes beyond the at least two side faces of the plug-in body and engages groove shaped recesses in the receptacle for guidance of the unit into the receptacle. The plug-in body may be formed of curable foam and the flanges may be formed with recesses for engaging spring tabs.

11 Claims, 3 Drawing Sheets

MOTOR-VEHICLE CONTROL UNIT

CROSS-REFERENCE TO RELATED APPLICATION

This application is a continuation of application Ser. No. PCT/DE96/00424, filed Mar. 8, 1996.

BACKGROUND OF THE INVENTION

FIELD OF THE INVENTION

The invention relates to a motor-vehicle control unit having an electrical circuit on a support.

A heretofore known control unit for a motor vehicle (published German Patent Document DE 42 12 369 A1) has an electrical circuit disposed on a printed circuit board. The printed circuit board is disposed in a housing having three parts. The housing is screwed to part of the chassis of the motor vehicle.

The production and assembly of such a control unit involve a great number of operating steps: the housing parts are produced individually; the printed circuit board is secured to at least one of the housing parts; the housing parts are mechanically joined together; on the production line, the control unit is screwed with a great consumption of time to the chassis or body part of the vehicle. Screwing the control unit to the chassis part also requires enough space for positioning and actuating a screwdriving tool. An adequate amount of such space is not available in motor vehicles.

Heretofore known from the published German Patent Document DE 38 09 607 A1 and the German Utility Model DE 93 05 939 U1 are plug-in modules which are inserted or slid into module frames. A printed circuit board carrying an electrical circuit is secured between two metal lids so that the circuit is protected by the lids against electromagnetic radiation, and the printed circuit board projects laterally beyond the lid.

SUMMARY OF THE INVENTION

It is accordingly an object of the invention to provide a motor-vehicle control unit which overcomes the disadvantages of the heretofore known control units of this general type and, in particular, due to the construction thereof, can be produced and assembled relatively simply, briefly and economically.

With the foregoing and other objects in view, there is therefore provided, in accordance with the invention, a motor-vehicle control unit having an electrical circuit on a support, comprising a plug-in body encasing components of the electrical circuit and being formed with at least two side surfaces, the plug-in body being received in a receptacle of a motor vehicle, the support protruding beyond the at least two side faces of the plug-in body and engaging in groovelike recesses formed in the receptacle.

In accordance with another feature of the invention, the plug-in body is formed with curable foam.

In accordance with a further feature of the invention, the receptacle is provided with spring tabs, and the protruding region of the support forms guide elements for the plug-in body, the guide elements being formed with at least one recess wherein the spring tabs of the receptacle are receivable when the plug-in body is disposed in a final position thereof in the receptacle.

In accordance with an added feature of the invention, the receptacle has relatively long sides, and beads are disposed in a region of the relatively long sides of the receptacle.

In accordance with an additional feature of the invention, the support is formed by a printed electrical circuit board.

In accordance with yet another feature of the invention, the support is formed by a metal plate having track conductors stamped therein.

In accordance with yet a further feature of the invention, the receptacle is formed with an opening for receiving the plug-in body therethrough, the receptacle being constructed longer by a given distance than the plug-in body in the region of said opening.

In accordance with an added feature of the invention, the plug-in body forms at least part of a control unit for an air bag.

In accordance with a concomitant feature of the invention, the plug-in body includes a plug for receiving a mating connector.

A receptacle of the control unit, for example, a stamped bent part, is welded to a motor-vehicle body part or chassis, such as the transmission tunnel, when the vehicle body is being made and consequently is an integral component of the vehicle body. Optionally, the receptacle may also be produced integrally with the corresponding chassis or vehicle body part. In each case, the receptacle is solidly joined to the body in the form of a nonreleasable connection. The time-intensive and expensive screw connection between the receptacle and the body part in heretofore known control units and the complicated and expensive production of a plurality of housing parts and screwing the housing parts together are omitted.

The support that carries the control unit is inserted into groovelike recesses of the receptacle.

Because the control unit is used in a motor vehicle, the circuit must be protected against mechanical actions, environmental factors such as moisture, and the like, and electromagnetic radiation. To that end, according to the invention, the circuit disposed on the support, or components of the circuit, are encased by a plug-in body, so that the circuit and or components thereof are protected against mechanical action and moisture when the circuit is being transported to the vehicle, while it is being installed, and during its operation in the vehicle. The support with the circuit is preferably embedded, except for two peripheral regions, in the plug-in body. These peripheral regions protrude outwardly beyond at least two side surfaces of the plug-in body, so that the support, with the protruding regions, can be inserted into groovelike recesses of the receptacle. The receptacle, of metal or other suitable materials, shields the circuit against electromagnetic radiation.

In accordance with the invention, a control unit is provided wherein the plug-in body can be secured simply, safely and quickly in the receptacle.

To ensure operating safety, the support is surrounded by a curable plastic foam or other nonconductive foam, preferably polyurethane, which assumes the shape of the plug-in body, in the cured state thereof. A curable plastic is advantageous over an injected plastic in the sense that the curable plastic can be applied at low temperature to the components so that the components will not be destroyed by the effects of heat. Furthermore, the application of the foam to the circuit is performed at considerably lower pressure than is plastic injection molding, which is again advantageous for the operability of the circuit and its components.

To secure the plug-in body in the receptacle, spring tabs are advantageously provided in the receptacle and are engageable in suitable recesses formed in the support of the plug-in body. Thus, fastenings by screws, rivets and the like are not needed.

In addition, beads disposed on the receptacle can improve the rigidity of the receptacle, thereby also, in an air bag control unit, the transmission of crash signals to sensors in the plug-in body is improved.

The plug-in body is inserted into an opening formed in the receptacle. Via this opening, parasitic electromagnetic radiation can act upon the circuit in the interior of the receptacle. The receptacle therefore preferably protrudes, in the region of the opening, beyond the introduced plug-in body, so that a so-called hollow conductor effect ensues with regard to the parasitic radiation and, as a result, the radiation strength can be brought to the desired level without further additional provisions.

If the control unit is embodied as an air bag control unit, then by the good contact achieved by a form-locking insertion of the support into the receptacle, the transmission of crash signals to the sensors present in the interior of the plug-in body and secured to the support is moreover improved. In this regard, it is noted that a form-locking connection is one which connects two elements together due to the shape of the elements, as opposed to a force-locking connection, which locks the elements together by force external to the elements.

The support may be embodied as a conventional printed circuit board, or as a printed circuit board or leadframe stamped from a metal strip. If the printed circuit board is a stamped part, then via the stamped part, which contains the circuit and is introduced into the metal receptacle, and which is thus at least partly electrically connected to the receptacle, it is possible, without additional effort, for the ground potential of the circuit to be connected to the potential of the receptacle, for heat to be dissipated from power components disposed on the stamped part, and for parasitic electromagnetic radiation to be diverted from the circuit to the receptacle, thereby improving the EMV protection of the control unit.

The plug-in body preferably includes a plug which, with a mating conductor or counterpart plug element forms a plug connection by which the control unit is electrically connected to a power supply, for example, or sensors and actuator devices, or other control units. For example, one part of the plug-in body is constructed as a plug body that surrounds connection pins. If the support is formed as a stamped part, then individually stamped-out metal tracks can be used as the connection pins of the plug.

The mating connector or counterpart plug is preferably connected to the receptacle, for example, via detent hooks. A mechanic is thus induced to connect the mating connector or counterpart plug mechanically with the receptacle before the plug-in body, including the plug, is pushed into the receptacle. The air bag is thereby prevented from being tripped accidentally during assembly, which can otherwise easily happen in heretofore known air bag control units: Until now, control units were often connected to the mating connector or counterpart plug before the control unit was screwed to the vehicle. If the already plugged-in but not yet secured control unit should be accidentally dropped due to an oversight and if the power supply should have been turned on at that time, the air bag could be tripped unintentionally.

In the control unit of the invention, an electrical plug connection with the mating connector or counterpart plug can be made only with the plug-in body inserted and, in that condition, there is no longer any possibility that the control unit will be dropped.

Other features which are considered as characteristic for the invention are set forth in the appended claims.

Although the invention is illustrated and described herein as embodied in a motor-vehicle control unit, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, wherein:

DESCRIPTION OF THE PREFERRED EMBODIMENTS

Figure 1:
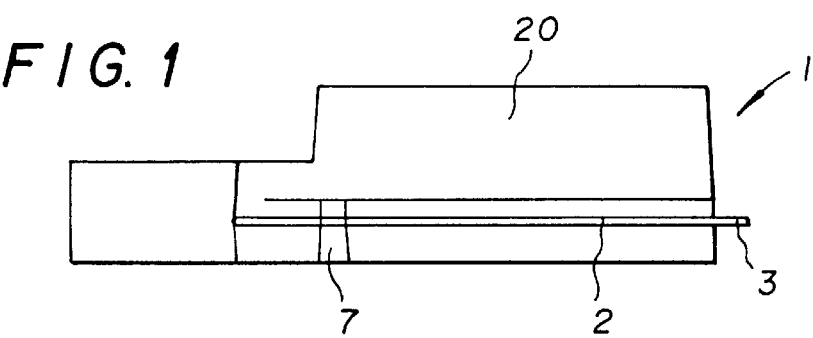
FIG. 1 is a side elevational view of a plug-in or slide-in body for forming an air bag control unit.
Figure 2:
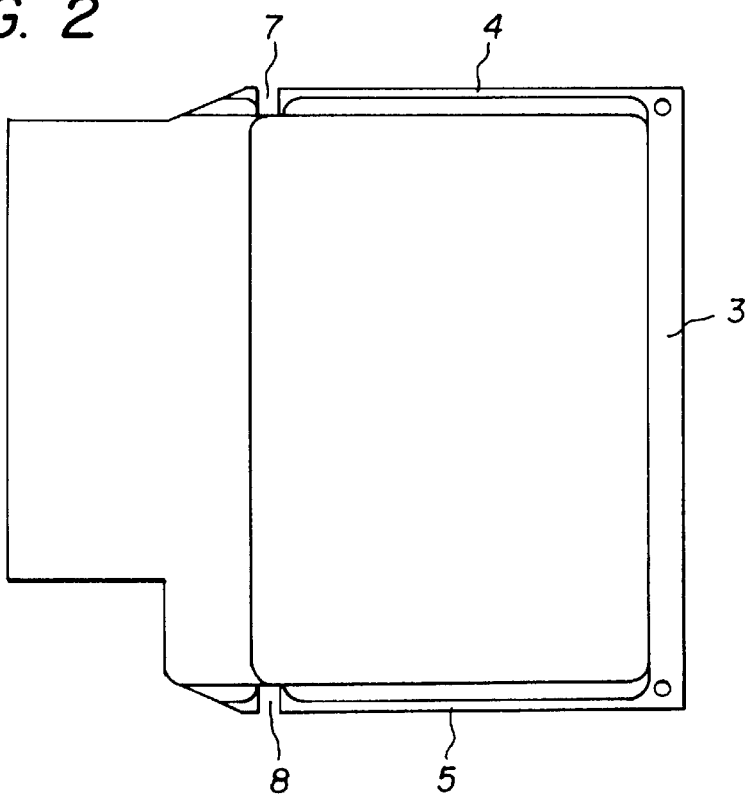
FIG. 2 is a plan view of FIG. 1.
Figure 3:
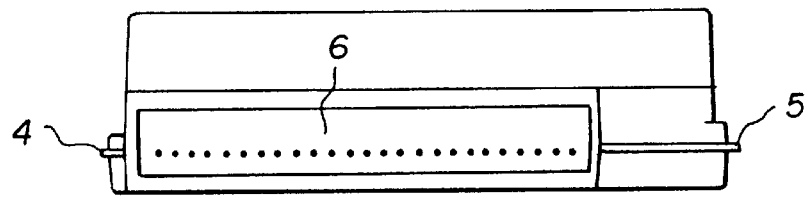
FIG. 3 is an elevational view as seen from the front or plug side of the plug-in or slide-in body, i.e., from the left-hand side of FIGS. 1 and 2.
Figure 7:
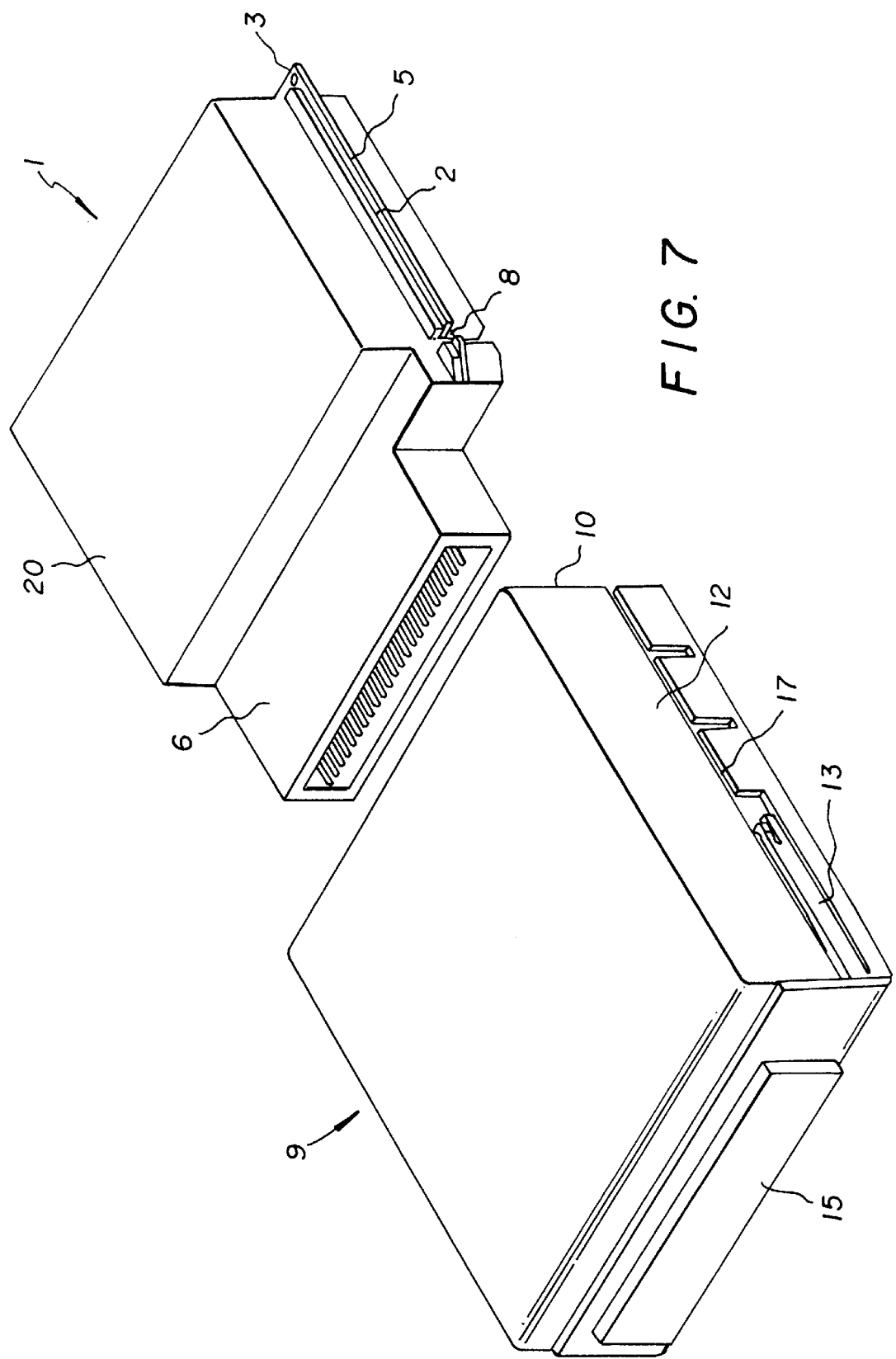
FIG. 7 is a perspective view as seen from a rear corner of a motor-vehicle control unit according to the invention which includes a receptacle within which the plug-in or slide-in body of FIG. 1 is received.

Referring now to the drawings and, first, particularly to FIGS. 1 to 3 and 7 thereof, there is shown therein a plug-in or slide-in body 1, which may form an air bag control unit. An essential component is a support 2, such as a metal plate having track conductors or a printed electrical circuit board, for otherwise non-illustrated electrical components, which protrudes at a peripheral region thereof on three sides 3, 4 and 5, in this case, beyond the plug-in body 1. The support 2 is formed by a stamped metal plate, in order to decrease the production costs and increase the mechanical rigidity of the support 2. The support 2 is further encased in a curable foam 20 in order to attain the desired shape of the plug-in or slide-in body 1. Also visible in FIGS. 3 and 7 is a plug body 6, through the intermediary of which, via a mating connector, electrical contact can be made with external devices. As further shown in FIGS. 1, 2 and 7, at least one recess 7, 8 is formed in the support 2 for the purpose of suitably locking the plug-in or slide-in body 1 in place.

Figure 4:
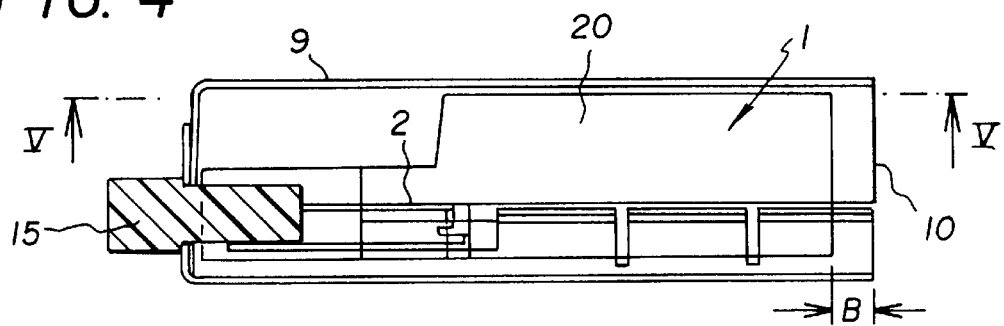
FIG. 4 is a longitudinal sectional view of a motor-vehicle control unit according to the invention which includes a receptacle within which the plug-in or slide-in body of FIG. 1 is received.
Figure 5:
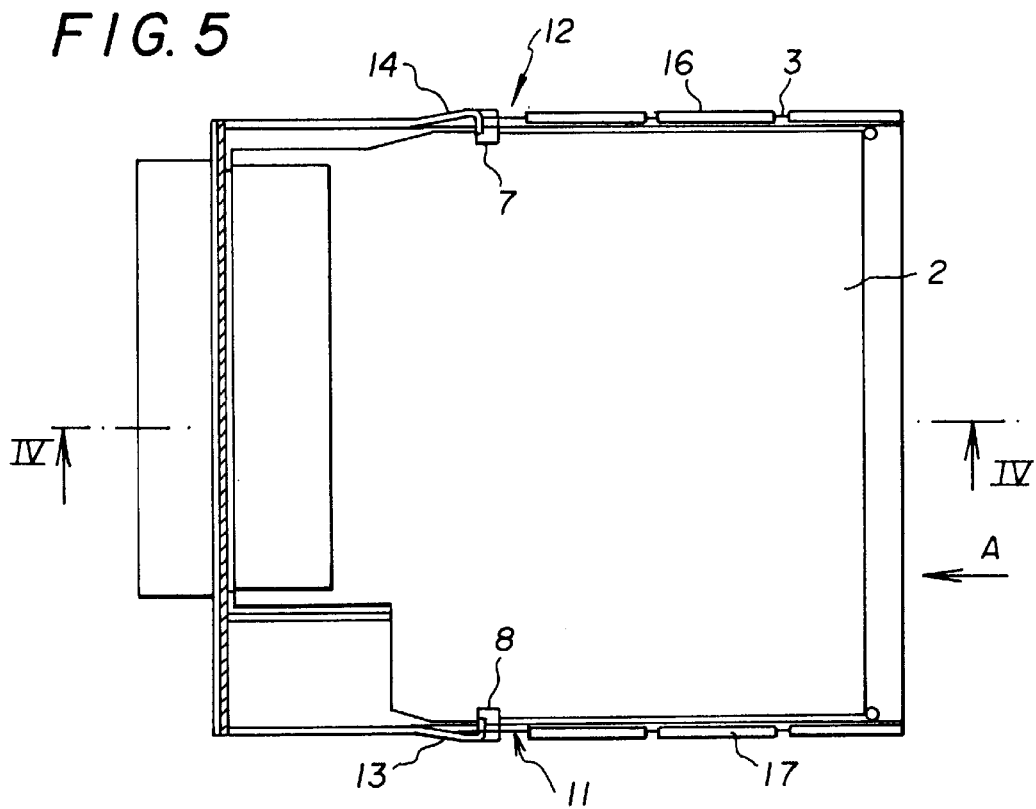
FIG. 5 is a sectional view of FIG. 4 taken along the line V—V opposite to the direction of the arrows.
Figure 6:
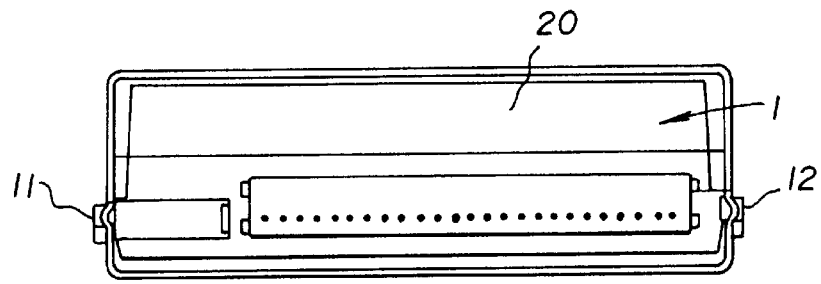
FIG. 6 is a front elevational view of FIG. 4 as seen from the left-hand or plug side thereof.

FIGS. 4 to 6 show the motor-vehicle control unit in an assembled state. A receptacle 9 is provided, which has an opening 10 on one side thereof. On respective long sides 11 and 12 of the receptacle 9, the latter is formed with groove-like guide recesses 16 and 17 wherein the protruding regions 4 and 5 (FIG. 2) of the support 2 of the plug-in or slide-in body 1 are engageable. To secure the plug-in or slide-in body 1 in the inserted condition thereof opposite to the direction of the arrow A shown in FIG. 5, the receptacle 9 is provided on both sides 11 and 12 thereof with spring tabs 13 and 14 formed as detent hooks; in the condition shown in FIG. 5, these tabs 13 and 14 lock in the corresponding recesses 7 and 8 of the support 2 and thus secure it in position. In FIG. 4, reference numeral 15 identifies a mating connector for the plug body 6, which makes electrical contact with the latter. Also worth noting are the beads disposed on the sides of the receptacle 9, by which the rigidity of the receptacle 9 is additionally improved.

We claim:

1. In a motor vehicle, a motor-vehicle control unit, comprising:
   a receptacle having groove-shaped recesses formed therein and being nonreleasably joined to the motor vehicle, said receptacle having at least one spring tab;
   a support having a protruding region;
   an electrical circuit having components, said electrical circuit disposed on said support; and
   a plug-in body encasing said components of the electrical circuit on said support and being formed with at least two side surfaces, said protruding region of said support forming guide elements for said plug-in body, said support protruding beyond said at least two side surfaces and engaging said groove-shaped recesses of said receptacle for receiving and guiding said plug-in body into said receptacle, and said guide elements having at least one recess receiving said at least one spring tab when said plug-in body is disposed in a final position in said receptacle.

2. The control unit according to claim 1, wherein said plug-in body is formed with curable foam.

3. The motor-vehicle control unit according to claim 1, wherein said support is a printed electrical circuit board.

4. The motor-vehicle control unit according to claim 1, wherein said support is a metal plate having track conductors.

5. The motor-vehicle control unit according to claim 1, wherein said receptacle has an opening formed therewithin for receiving said plug-in body therethrough and is constructed longer than said plug-in body in a region of said opening.

6. The motor-vehicle control unit according to claim 1, wherein said plug-in body is at least part of a control unit for an air bag.

7. The motor-vehicle control unit according to claim 1, wherein said plug-in body has a plug for receiving a mating connector.

8. The motor-vehicle control unit according to claim 7, wherein said receptacle has a mating connector for electrically connecting the motor-vehicle control unit to the motor vehicle.

9. The motor-vehicle control unit according to claim 1, wherein said receptacle is welded to the motor vehicle.

10. The motor-vehicle control unit according to claim 1, wherein said receptacle is an integral component of the motor vehicle.

11. The motor-vehicle control unit according to claim 1, wherein said receptacle has a mating connector for electrically connecting the motor-vehicle control unit to the motor vehicle.

* * * * *